United States Patent [19]

Nakamura et al.

[11] 4,006,081
[45] Feb. 1, 1977

[54] METHOD FOR PREVENTING GELATION OF THERMOSETTING RESINS IN WASTE WATER

[75] Inventors: Nobutaka Nakamura; Yukio Saeki, both of Fujieda, Japan

[73] Assignee: Sumitomo Durez Company, Ltd., Tokyo, Japan

[22] Filed: Dec. 31, 1974

[21] Appl. No.: 537,812

[30] Foreign Application Priority Data

Jan. 8, 1974   Japan .............................. 49-5106

[52] U.S. Cl. .................................. 210/58; 210/59
[51] Int. Cl.$^2$ ........................................ C02B 1/18
[58] Field of Search ................ 210/43, 47, 54, 58, 210/59; 260/29.3, 51.5

[56] References Cited

UNITED STATES PATENTS

| | | |
|---|---|---|
| 2,502,511 | 4/1950 | Davies et al. ................... 260/51.5 |
| 2,549,372 | 4/1951 | Fetterly ............................ 210/54 |
| 3,696,622 | 10/1972 | Tohma et al. ................... 260/51.5 |
| 3,869,387 | 3/1975 | Vargiu et al. ...................... 210/54 |
| 3,911,046 | 10/1975 | Ackermann et al. ............. 260/29.3 |

OTHER PUBLICATIONS

Haskell, "Handling Phenolic Resin etc.," *Forest Products Journal*, Sept. 1971, pp. 64–69.

*Primary Examiner*—Charles N. Hart
*Assistant Examiner*—Peter A. Hruskoci
*Attorney, Agent, or Firm*—Peter F. Casella; Howard M. Ellis

[57] ABSTRACT

A method for preventing the gelation of thermosetting resin glues or varnishes in waste wash water characterized by mixing urea into the waste water which principally contains resorcinol resin obtained by reacting resorcinol with formaldehyde or phenol modified resorcinol resin obtained by reacting phenol, resorcinol and formaldehyde.

3 Claims, No Drawings

METHOD FOR PREVENTING GELATION OF THERMOSETTING RESINS IN WASTE WATER

BACKGROUND OF THE INVENTION

The present invention relates to a method for preventing gelation in waste wash water which contain glues or varnishes of resorcinol resins or phenol modified resorcinol resins.

Resorcinol resins made by reacting resorcinol with formaldehyde, or phenol modified resorcinol resins made by reacting resorcinol and phenol with formaldehyde have the advantage of curing at ambient or lower temperatures by adding formaldehyde donors. Therefore, they have a wide range of practical uses when used as adhesives or varnishes.

However, this advantage which makes the cure proceed at ambient temperature when applied as adhesives or varnishes reacts adversely, on the other hand, to the wastes resulting from washing the mixers, spreaders and other tools and machines used with such adhesives, thereby transforming them into a watery, gelatinous, agar-agar state within a several day period, during which the curing reaction between resorcinol resin or phenol modified resorcinol resin and the formaldehyde donor proceeds gradually at ambient temperature. Resorcinol resins or phenol modified resorcinol resins are usually made into glues or varnishes by adding paraformaldehyde or formalin as a hardener immediately before use. Waste water from washing the equipment and machines used for mixing and applying those glues or varnishes are deep reddish brown and show a high chemical oxygen demand (COD) and biochemical oxygen demand (BOD), because the waste water contains free resorcinol, free phenol, free formaldehyde, etc. besides resinous matters. Therefore, it is necessary to make such washing wastes harmless by chemical or chemical engineering treatments, or to incinerate them. It is usual to store the waste wash water after collecting up to some large volume, at which time the forming of a watery agar-agar state gel during storage of such washing wastes at ambient temperature as described above becomes an issue. Namely, chemical treatments such as oxidizing or an aggregation-separating and the like of the waste wash water are applicable only when the wastes are in very low viscosity liquid state. On the other hand, the gel state of those washings are difficult to burn, so if it is burnt, such washings must be kept in liquid state and burned in an incinerator with the use of a heavy or light oil burner as accelerator.

SUMMARY OF THE INVENTION

The present invention was discovered and applied to practical use successfully by preventing the formation of an agar-agar state gel containing water by adding and mixing urea into washings as a treatment of those which come from glues or varnishes or resorcinol resins or phenol modified resorcinol resins. This is the result of our studies in finding a possibility for long-term preservation of those washings in liquid state at ambient temperature. Such a treatment had not been considered in the past.

DETAILS OF EMBODIMENTS

In relation to such an effect obtained by adding and mixing urea to the washings from glues or varnishes of resorcinol resins or phenol modified resorcinol resins, the inventors presume that the added and mixed urea reacts with the free formaldehyde thereby decreasing its content in such glues so that the reactivity of those washings is impeded remarkably by the following reaction:

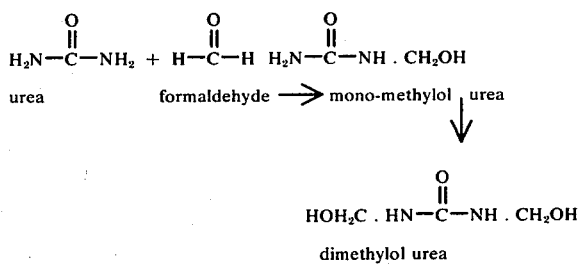

This reaction consumes more than 90% of the free formaldehyde content in such a short time as 20 minutes to 120 minutes at ambient temperature by adding urea somewhat in excess of the theoretical amount.

Resorcinol has a reaction velocity of about 8 times more with formaldehyde when compared with phenol, and easily forms condensates and resinifies at ambient temperature. Therefore, in case of reacting formaldehyde in excess of 1.0 mole to 1.0 mole resorcinol, reaction takes place at ambient temperature and a three dimensional net structure gel forms. So, in case of manufacturing resorcinol resins, usually 0.5–0.8 mole of formaldehyde is added to 1.0 mole of resorcinol and resinified. But, it is impossible for the resin under this state to form a three dimensional net structure, so, in case of using those as adhesives or varnishes, formaldehyde of the resin blend becomes 1.0 to 3.0 moles against 1.0 mole of resorcinol whereby the formaldehyde which dissociates from such donors forms a three dimensional net structure by cross-linking the resin in the above-mentioned liquid state, and completes an infusible, insoluble, hardened matter.

At present, resorcinol is high in price, so the resins produced by substituting 10–70% of resorcinol with phenol with a view to decrease the raw material cost of resorcinol resins are phenol modified resorcinol resins, and the curing mechanism is almost the same as that in the case of resorcinol resins.

The method of the invention is applicable to resorcinol-aldehyde resins in general, wherein the aldehyde can be formaldehyde, acetaldehyde, propionaldehyde, and the like. Typical resins are resorcinol-aldehyde resins and resorcinol-phenol-formaldehyde resins.

In the washings which contain glues or varnishes of resorcinol resins or phenol modified resorcinol resins, the concentration of such resins is usually less than 30%, in spite of the larger content of water and organic solvents such as methanol, ethanol and so forth in the washings, such wastes easily form a watery agar-agar state gel when left several days at ambient temperature. It is considered that the main causes for this gelation are that formaldehyde dissociating from formaldehyde donors mixed as hardeners of glues or varnishes of resorcinol resins or phenol modified resorcinol resins retain a high reactivity with those resins in the washings, and also that resorcinol resins and phenol modified resorcinol resins are highly hydrophobic.

The performance of glues or varnishes of resorcinol resins or phenol modified resorcinol resins are remarkably influenced by the reaction factors for production of those resins such as molar ratio of formaldehyde to resorcinol or to phenol, type of catalysts and amounts added, reaction temperature and time, type of solvents amd amounts added, and the like, and also by the amount of paraformaldehyde or formalin added as a hardener. Therefore, in case of practical use, a suitable resin, a suitable kind and amount of hardener should be selected with due consideration given to the object of their usage and the conditions under which they are to be applied. Consequently, in order to prevent or inhibit the gelation of those washings while in storage at ambient temperature, when deciding the proper amount of urea to be added to such waste water it is necessary not only to refer to the free formaldehyde content in such washings but also refer to the amounts of paraformaldehyde or formalin actually used as a hardener, respectively.

The urea is employed in a proportion sufficient to inhibit or prevent gelation, i.e., in a gelation inhibiting proportion. From the foregoing description this proportion is sufficient to prevent the aldehyde content of the waste water from causing gelation.

We have investigated aqueous ammonia, amine compounds or melamine and the like, other than urea for their effectiveness in decreasing the reactivity of the washings containing glues or varnishes of resorcinol resins or phenol modified resorcinol resins, by consuming the free formaldehyde in them. But, aqueous ammonia or amine compounds are excessively malodorous for handling when adding them to those washings, and further, if the mixed amount of aqueous ammonia or amine compounds are somewhat in excess of the theoretical amount required to consume the free formaldehyde, the bad odor of unreacted ammonia or amine compounds remains behind, providing a big problem for the operators at work. In case of melamine, the methylol melamine, formed by the free formaldehyde in the washings decrease the solubility of resins, and the dissolved resorcinol resins or phenol modified resorcinol resins of the waste waters separate. The separation of resorcinol resins or phenol modified resorcinol resins from such washings provides a big hinderance for further treatment in making those washings harmless. Therefore, although the mixing of chemicals such as aqueous ammonia, amine compounds or melamine and the like are effective for preventing gelation of those washings by consuming the free formaldehyde in such wastes from glues or varnishes of resorcinol resins or phenol modified resorcinol resins, they have shortcomings for further processing described above. However, the mixing of urea for preventing the gelation of those washings have the following characteristics which can not be found in other free-formaldehyde-binding chemicals added to those washings: urea prevents the gelation of those washings by reacting rapidly with their free formaldehyde at ambient temperature; there is no unpleasant odor of the chemical while handling the work; and even if the amount of urea mixed is in excess of the theoretical amount required to consume the free formaldehyde in those washings, there is no fear of being forced to slow down the process for treatment.

The following examples are shown so as to explain more concretely the present invention, but the present invention is not restricted by them. "Parts" and "%" described herein refer to "parts" and "percentages" by weight respectively unless otherwise specified.

EXAMPLE 1

(Applied to a laminated wood plant.)

100 Kgs of phenol modified resorcinol resin adhesive (modified ratio of phenol to resorcinol is 30%, molar ratio of formaldehyde per phenol plus resorcinol is nearly equal to 0.6) was made into glue by adding 15 kgs of a hardener (composition ratio:-paraformaldehyde/walnut shell powder [filler] ≈ 70/30). This glue was spread on lumber of Japanese cypress with a glue spreader, then they were laminated and adhered under pressure for about 24 hours at ambient temperature (20°–25° C), and the laminated wood was completed by finishing further.

After finishing the spreading of the glue, about 2 kgs of such glue remaining adhered to the glue spreader and mixer were washed with about 20 kgs of city water. About 22 kgs of the wash water obtained was collected in a waste water tank installed at the lower part of the glue spreader, and 0.5 kg of urea was added to it and dissolved by 5 minutes agitation at ambient temperature, then left there. Such a washing mixed with urea could be kept in liquid state without gelation for more than 30 days at 40° C. In contrast to the above-described, when urea was not added herein, the washings gelled 2 days later at 20° C. The washing mixed with urea described above was impregnated at 35° C and 4 days later into about 20 kgs of wood waste, then burned in an incinerator using such wood waste as fuel.

EXAMPLE 2

(Applied to a manufacturing plant of residential building panels.)

100 kgs of phenol modified resorcinol resin adhesive (modified ratio of phenol to resorcinol is 70%, molar ratio of formaldehyde per phenol plus resorcinol is nearly equal to 0.65) were made into glue by adding 15 kgs of a hardener (composition ratio:-paraformaldehyde/walnut shell powder [filler] ≈ ≈40/60) This glue was spread on the surface of the frame made of Todomatsu (white fir or Abies sachalinensis) with a glue spreader, and, after fixing a Type I plywood of lauan on the surface of such frame with tacks, they were pressure-bonded around 24 hours at ambient temperature, and after further finishing, the residential building panel were completed.

After finishing the spreading of the glue, about 3 kgs of such glue which remained adhered to the glue spreaders and mixers were washed with about 80 kgs of city water. About 83 kgs of the washings obtained herein were collected in a waste water tank installed at the lower part of glue spreader, and 1 kg of urea was added to it, then dissolved by about 5 minutes agitation at ambient temperature and left standing. Such a washing waste water mixed with urea could be kept in liquid state without gelation for more than 30 days at 40° C. When urea was not added herein, the washings became gelled after 4 days when left at 35° C., and after 8 days when left at 20° C. The washing mixed with urea described above was burned in an incinerator using heavy oil as fuel.

EXAMPLE 3

(Applied to a manufacturing plant for skis.)

20 kgs of resorcinol resin adhesive (molar ratio:formaldehyde/resorcinol ≈ 0.70) were prepared to glue by adding 2 kgs of a hardener (paraformaldehyde). This glue was spread on a surface of a phenolic resin laminate With a glue spreader, and the laminate was bonded to the side of heartwood of the ski by pressing 20 minutes at about 80° C.

After finishing the spreading of the glue, about 1 kg of such glue which remained adhered to the glue spreader was washed with about 10 kgs of city water and 2 kgs of methanol. About 13 kgs of the washing waste obtained were collected in a waste water tank installed at the lower part of glue spreader to which was added 0.2 kg of urea, dissolved by about 5 minutes agitation at ambient temperature and left standing. Such a washing mixed with urea could be kept in liquid state without gelation for more than 30 days at 40° C. When urea was not added herein, the washings gelled after 3 days at 35° C., and after 6 days at 20° C. The washing mixed with urea described above were impregnated into about 10 kgs of wood waste, then burned in an incinerator using such wood waste as fuel.

We claim:

1. A method of preventing gelation of waste wash water containing glues or varnishes of resorcinol resins and excess free aldehyde, which consists essentially of adding urea to the waste wash water at ambient temperature in an amount which is sufficient to prevent the aldehyde content of the waste wash water from causing gelation, agitating said waste wash water consisting essentially of urea, water, a resorcinol-aldehyde resin having from 0.5 to 0.8 of aldehyde per mole of of resorcinol, and excess free aldehyde contained in said waste wash water to react said urea with said excess free aldehyde and prevent gelation of said resins in said waste wash water.

2. The method of claim 1 wherein the resin is a resorcinol-formaldehyde resin and the aldehyde is formaldehyde.

3. The method claim 1 wherein the resin is a resorcinol-phenol-formaldehyde resin.

* * * * *